United States Patent
Jin et al.

(10) Patent No.: US 10,652,645 B2
(45) Date of Patent: May 12, 2020

(54) WIRELESS HEADSET AND SIGNAL TRANSMISSION METHOD FOR THE SAME

(71) Applicant: TELINK SEMICONDUCTOR (SHANGHAI) CO., LTD., Shanghai (CN)

(72) Inventors: Haipeng Jin, Shanghai (CN); Mingjian Zheng, Shanghai (CN)

(73) Assignee: TELINK SEMICONDUCTOR (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/361,645

(22) Filed: Mar. 22, 2019

(65) Prior Publication Data

US 2020/0092630 A1    Mar. 19, 2020

(30) Foreign Application Priority Data

Sep. 17, 2018  (CN) .......................... 2018 1 1080912

(51) Int. Cl.
*H04R 1/10*    (2006.01)
*H04W 76/10*    (2018.01)

(52) U.S. Cl.
CPC .......... *H04R 1/1041* (2013.01); *H04W 76/10* (2018.02); *H04R 2420/07* (2013.01)

(58) Field of Classification Search
CPC .............................. H04R 1/1041; H04W 76/10
See application file for complete search history.

(56) References Cited

U.S. PATENT DOCUMENTS

| | | | |
|---|---|---|---|
| 9,742,471 B1* | 8/2017 | Thoen | H04L 67/1095 |
| 2016/0219358 A1* | 7/2016 | Shaffer | H04R 1/1041 |
| 2017/0366924 A1* | 12/2017 | Thoen | G06T 13/80 |
| 2018/0184234 A1* | 6/2018 | Chen | H04W 76/14 |
| 2019/0104424 A1* | 4/2019 | Hariharan | H04R 3/12 |

\* cited by examiner

*Primary Examiner* — Simon King
(74) *Attorney, Agent, or Firm* — Nixon & Vanderhye P.C.

(57) ABSTRACT

Disclosed is a wireless headset and a signal transmission method for the same, the method comprises: sending, by a first earpiece, channel information about an audio transmission channel to a second earpiece after establishing the audio transmission channel with a mobile device; receiving, by the first earpiece, audio data from the audio transmission channel, and sending a response message to the mobile device; and receiving, by the second earpiece, audio data from the audio transmission channel according to the channel information about the audio transmission channel. The mobile device enables the two earpieces both to receive the audio data without maintaining two channels and it only requires the first earpiece to return a response message to the mobile device; and the difference between the energy consumption of the two earpieces is relatively small, and the mobile device only needs to maintain one channel, thus the complexity is relatively low.

14 Claims, 4 Drawing Sheets

WIRELESS HEADSET AND SIGNAL TRANSMISSION METHOD FOR THE SAME

CROSS-REFERENCE TO RELATED PATENT APPLICATION

This application claims the benefit of and priority to Chinese Patent Application No. 201811080912.9 filed on Sep. 17, 2018, the entire disclosure of which is incorporated by reference herein.

TECHNICAL FIELD

The present invention relates to the field of data processing, and in particular, to a wireless headset and a signal transmission method for the same.

BACKGROUND

Bluetooth™-based wireless headsets are very popular mobile device accessories. At present, data transmission of a wireless headset is generally implemented in the following two ways:

1) As shown in FIG. 1, a mobile device transmits an audio signal to a first earpiece of a headset via Bluetooth™, and the first earpiece transmits the audio signal to a second earpiece of the headset via Radio Frequency (RF) or a low-frequency signal.

Data transmission in this way causes mismatch of the energy consumptions of the two earpieces with each other, that is, the energy consumption of the first earpiece is much greater than that of the second earpiece, thus the usage time is limited.

2) As shown in FIG. 2, a mobile device establishes Bluetooth™ channels for the two earpieces respectively and transmits audio signals via the corresponding Bluetooth™ channels respectively.

In the case of data transmission in this way, the energy consumptions of the two earpieces matches each other, but independent Bluetooth™ channels need to be established respectively, thus complexity of the transmission is relatively high.

SUMMARY

Directing against the above problems that the energy consumptions of two earpieces do not match each other and the transmission is relatively complex, the present invention provides a wireless headset and a signal transmission method for the same, which can match the energy consumptions of the two earpieces each other with a lower complexity.

In one aspect of the invention, there is provided a signal transmission method for a wireless headset, which includes:
sending, by a first earpiece of the wireless headset, channel information about an audio transmission channel to a second earpiece of the wireless headset after establishing the audio transmission channel with a mobile device;
receiving, by the first earpiece, audio data from the audio transmission channel, and sending a response message to the mobile device; and
receiving, by the second earpiece, the audio data from the audio transmission channel according to the channel information about the audio transmission channel.

In some embodiments, the channel information about the audio transmission channel may specifically include: clock synchronization information, frequency hopping channel information, packet format, signal modulation information and packaging format.

In some embodiments, the method may further include:
sending, by the first earpiece when determining that current dominant earpiece needs to be switched over, a switching command to the second earpiece, and stopping sending the response message to the mobile device; and
sending, by the second earpiece after receiving the switching command, a response message to the mobile device after receiving the audio data from the audio transmission channel.

In some embodiments, the method may further include:
sending, by the first earpiece when determining that the first earpiece itself is taken off, a switching command to the second earpiece, and stopping receiving the audio data and stopping sending the response message to the mobile device; and
sending, by the second earpiece after receiving the switching command, a response message to the mobile device after receiving the audio data from the audio transmission channel.

In certain embodiments, the method may further include:
acquiring, by the first earpiece when being put on again, new channel information about the audio transmission channel from the second earpiece and receiving the audio data from the audio transmission channel according to the new channel information.

In some embodiments, the method may further include:
stopping, by the second earpiece, receiving the audio data when determining that the second earpiece itself is taken off.

In certain embodiments, the method may further include:
acquiring, by the second earpiece when being put on again, new channel information about the audio transmission channel from the first earpiece again, and receiving the audio data from the audio transmission channel according to the new channel information.

In another aspect of the invention, there is further provided a wireless headset, which includes a first earpiece and a second earpiece, wherein:
the first earpiece is configured to send channel information about an audio transmission channel to the second earpiece after establishing the audio transmission channel with a mobile device, receive audio data from the audio transmission channel, and send a response message to the mobile device; and
the second earpiece is configured to receive the channel information about the audio transmission channel and receive the audio data from the audio transmission channel according to the channel information about the audio transmission channel.

In some embodiments, the channel information about the audio transmission channel may specifically include:
clock synchronization information, frequency hopping channel information, packet format, signal modulation information and packaging format.

In some embodiments, the first earpiece may further be configured to:
when determining that dominant earpiece needs to be switched over, send a switching command to the second earpiece and stop sending the response message to the mobile device; and
the second earpiece may further be configured to:
after receiving the switching command, send a response message to the mobile device after receiving the audio data from the audio transmission channel.

In some embodiments, the first earpiece may further be configured to:

when determining that the first earpiece itself is taken off, send a switching command to the second earpiece, and stop receiving the audio data and stop sending the response message to the mobile device; and the second earpiece may further be configured to:

after receiving the switching command, send a response message to the mobile device after receiving the audio data from the audio transmission channel.

In certain embodiments, the first earpiece may further be configured to:

when determining that the first earpiece is put on again, acquire new channel information about the audio transmission channel from the second earpiece and receive the audio data from the audio transmission channel according to the new channel information.

In some embodiments, the second earpiece may further be configured to:

when determining that the first earpiece itself is taken off, stop receiving the audio data.

In certain embodiments, the second earpiece may further be configured to:

when determining that the second earpiece is put on again, acquire new channel information about the audio transmission channel from the first earpiece again and receive the audio data from the audio transmission channel according to the new channel information.

By employing the above solutions, because the first earpiece sends the channel information about the audio transmission channel to the second earpiece, the second earpiece can receive audio data from the audio transmission channel according to the channel information, thus the mobile device enables the two earpieces both to receive the audio data, via one data transmission on only one channel without maintaining two channels and it only requires one earpiece to return a response message to the mobile device; since the two earpieces receive data from the channel simultaneously, the difference between the energy consumption of the two earpieces is relatively small, and the mobile device only needs to maintain one channel, thus the complexity is relatively low.

It should be understood that, the above illustration merely shows a summarization of the technical solutions of the invention for more clearly understanding the technical measures of the invention so as to implement according to the description of the invention. To make the above and other objects, characteristics and advantages of the invention more apparent, the specific implementation modes of the invention will be illustrated below by specific examples.

BRIEF DESCRIPTION OF THE DRAWINGS

By reading the detailed description of the exemplary embodiments below, one skilled in the art will understand the advantages and benefits described herein and other advantages and benefits. The drawings are merely for the purpose of showing exemplary embodiments, rather than limiting the invention. Throughout the drawings, the same reference sign or numeral are employed to indicate the same parts. In the drawings.

DETAILED DESCRIPTION

Figure 1:
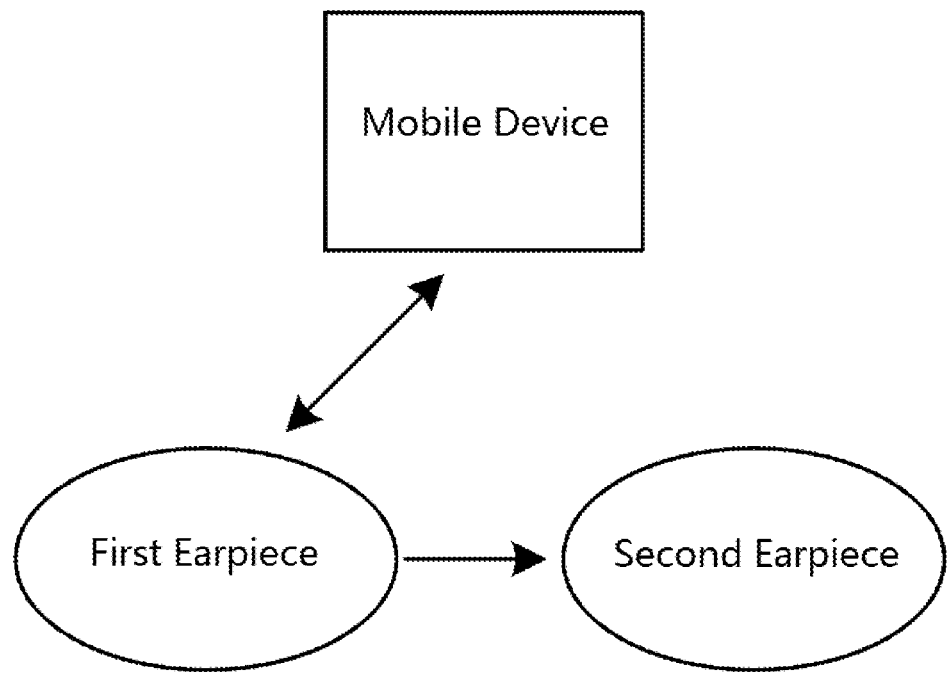
FIG. 1 and FIG. 2 are schematic diagrams showing the signal transmission of a wireless headset in the prior art.
Figure 2:
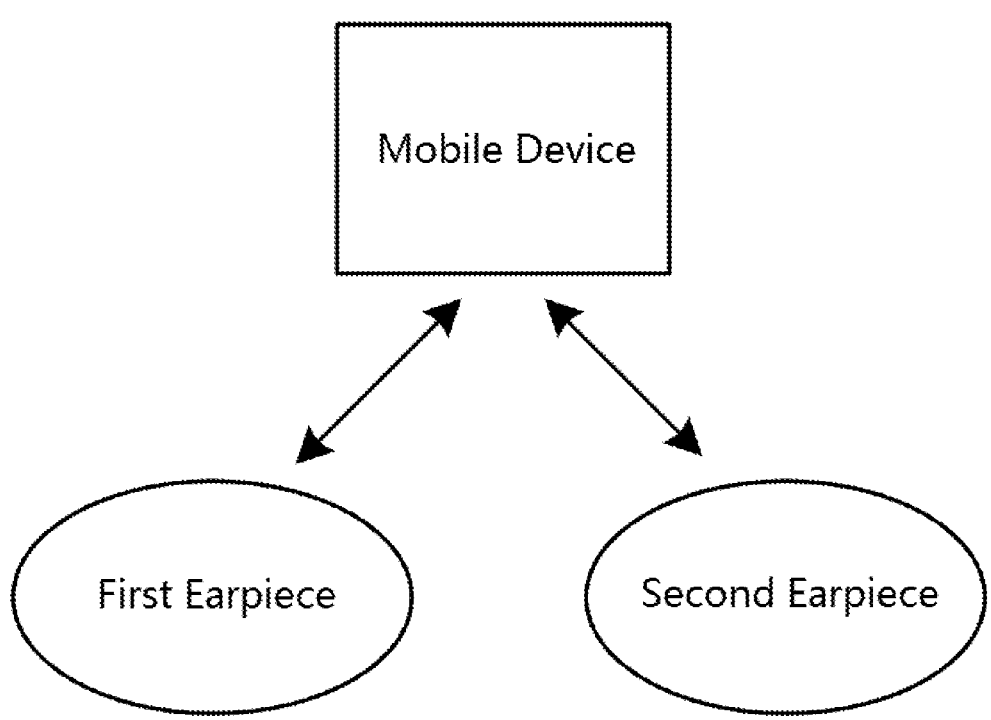

Exemplary embodiments of the present invention will be described in detail below in conjunction with the drawings. Although exemplary embodiments of the invention are shown in the drawings, it should be understood that the invention may be implemented in various forms, rather than being limited to the embodiments illustrated herein. On the contrary, these embodiments are provided for facilitating more thoroughly understanding of the invention and more fully conveying the scope of the invention to those skilled in the art.

In the invention, it should be understood that, terms such as "include" or "comprise", etc., indicate the existence of the characteristics, figures, steps, actions, components and parts disclosed in the invention or combinations thereof, without excluding the existence of one or more other characteristics, figures, steps, actions, components, parts or combinations thereof.

Additionally, it should be further noted that, the embodiments of the invention and the characteristics in the embodiments may be combined to each other in the case of no confliction. The invention will be illustrated in detail below referring to the drawings and in conjunction with the embodiments.

Figure 3:
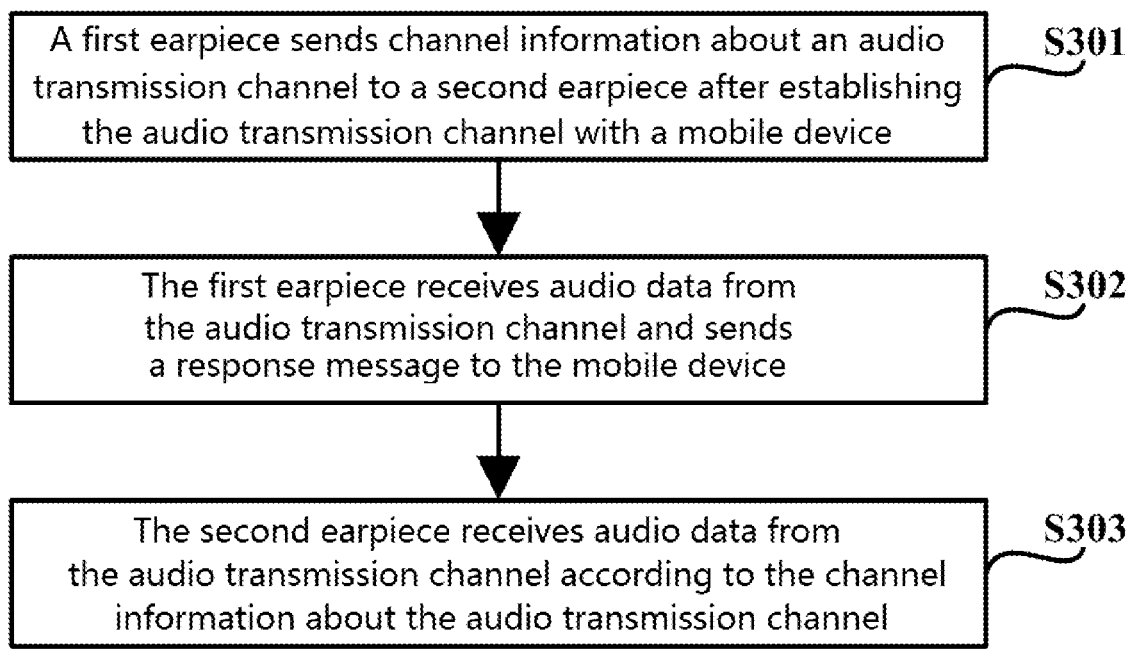
FIG. 3 is a flow chart of a signal transmission method for a wireless headset according to one embodiment of the invention.

As shown in FIG. 3, a signal transmission method for a wireless headset according to one aspect of the invention includes:

Step S301: A first earpiece of the wireless headset sends channel information about an audio transmission channel to a second earpiece of the wireless headset after establishing the audio transmission channel with a mobile device;

Step S302: The first earpiece receives audio data from the audio transmission channel and sends a response message to the mobile device; and Step S303: The second earpiece receives audio data from the audio transmission channel according to the channel information about the audio transmission channel.

Since the first earpiece sends the channel information about the audio transmission channel to the second earpiece, the second earpiece may receive audio data from the audio transmission channel according to the channel information, thus the mobile device would enable the two earpieces both to receive the audio data, via one data transmission on only one channel without maintaining two channels, and thus it would only require the first earpiece to return a response message to the mobile device. Since the two earpieces receive data from the channel simultaneously, the difference between the energy consumption of the two earpieces is relatively small, and the mobile device would only need to maintain one channel, thus the complexity would be relatively low.

The first earpiece may be the left earpiece, and the second earpiece may be the right earpiece; or the first earpiece may be the right earpiece, and the second earpiece may be the left earpiece.

In some embodiments, the first earpiece and the second earpiece may be switched to be dominant earpiece from one another, so that the audio transmission channel established with the mobile device can be switched from the first earpiece to the second earpiece without changing the audio transmission channel.

The audio transmission channel for audio transmission may be a Bluetooth™ channel or other channels.

Wherein, the channel information about the audio transmission channel may specifically include:

clock synchronization information, frequency hopping channel information, packet format, signal modulation information and packaging format.

For different types of audio transmission channels, one skilled in the art may determine the contents of the channel information according to practical situation, so long as the second earpiece may receive audio data via the audio transmission channel according to the channel information.

Generally, the channel information about the audio transmission channel may be transmitted via an RF channel between the first earpiece and the second earpiece. The RF channel may only be used for transmitting the channel information, rather than the audio data, thus the energy consumption would be very small, and the energy consumption balance between the first earpiece and the second earpiece would not be affected.

When the first earpiece determines that dominant earpiece needs to be switched over, it may send a switching command to the second earpiece and stop sending the response message to the mobile device.

After the second earpiece receives the switching command, it may send a response message to the mobile device after receiving audio data from the audio transmission channel.

Figure 4:
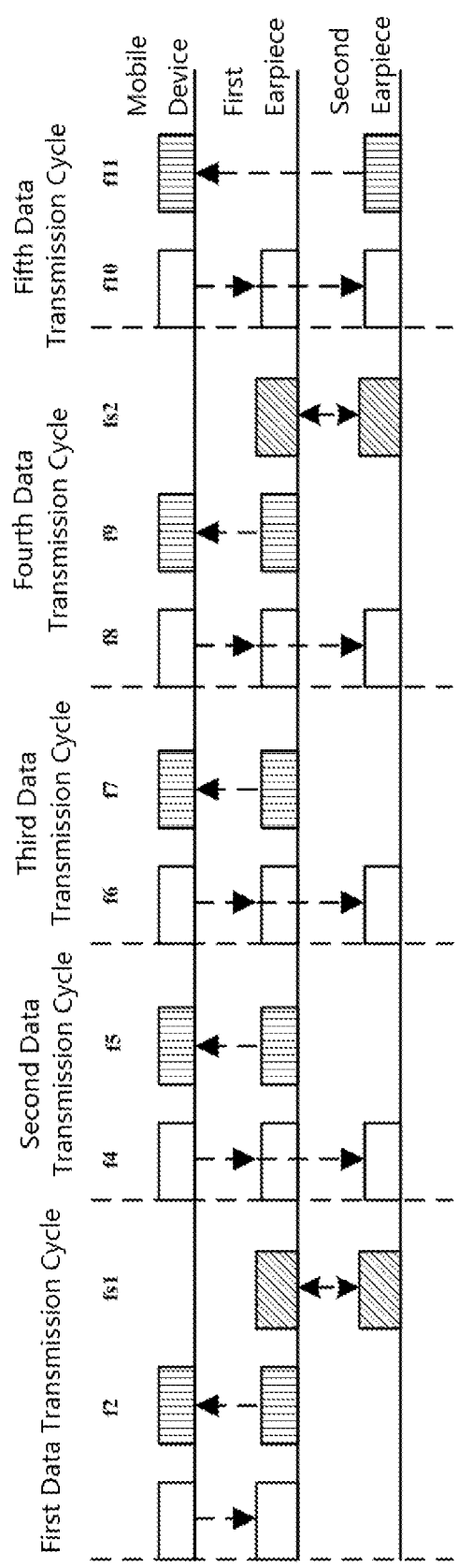
FIG. 4 is a timing diagram of the signal transmission of a wireless headset according to one embodiment of the invention.

As shown in FIG. 4, in the first data transmission cycle, the first earpiece may establish an audio transmission channel with the mobile device, and the first earpiece may send the channel information to the second earpiece; in the second, the third and the fourth data transmission cycles, the first earpiece may function as the dominant earpiece, receive the audio data from the mobile device and return a response message, and the second earpiece may function as the non-dominant earpiece and only receive audio data from the audio transmission channel according to the channel information; in the fourth data transmission cycle, the first earpiece may send a switching command to the second earpiece and the dominant earpiece and the non-dominant earpiece may be switched from one another; and in the fifth data transmission cycle, the second earpiece may function as the dominant earpiece, receive the audio data from the mobile device and returns a response message, and the first earpiece function as the non-dominant earpiece and receive audio data from the audio transmission channel.

The triggering condition for switching of the dominant earpiece and the non-dominant earpiece from one another may be that the first earpiece is taken off, or the switching may be performed per time cycle. As an alternative, in practical application, the switching may be performed according to other triggering conditions.

In some embodiments, for energy saving, the earpiece, when it is determined that the earpiece is taken off, may not receive data for the moment; and it may receive data again when it is determined that the earpiece is put on.

Specifically, when the first earpiece determines that the first earpiece itself is taken off, it may send a switching command to the second earpiece, stop receiving the audio data and stop sending the response message to the mobile device.

After the second earpiece receives the switching command, it may send a response message to the mobile device after receiving audio data from the audio transmission channel.

When the second earpiece determines that the first earpiece itself is taken off, it may stop receiving the audio data.

If the first earpiece is the dominant earpiece and the second earpiece is the non-dominant earpiece, then when the second earpiece determines that the second earpiece itself is taken off, it may stop receiving the audio data; and then when the second earpiece is put on again, it may acquire new channel information about the audio transmission channel from the first earpiece again and receive audio data from the audio transmission channel according to the new channel information.

If the first earpiece is the dominant earpiece and the second earpiece is the non-dominant earpiece, then when the first earpiece determines that the first earpiece itself is taken off, the second earpiece may be switched to be the dominant earpiece, and the first earpiece may stop receiving the audio data and sending the response message; and then when the first earpiece is put on again, the first earpiece may function as the non-dominant earpiece, acquire new channel information about the audio transmission channel from the second earpiece again, and receive audio data from the audio transmission channel according to the new channel information.

The taking off and putting on of the first earpiece and the second earpiece may be judged via a built-in sensor. For example, it may judge whether the earpiece is taken off or put on according to the acceleration determined by an acceleration sensor.

It should be noted that, although the operations of the method of the invention have been described in a specific order in the drawings, it does not require or suggest that the operations should be performs in this specific order or all the operations shown must be performed to realize the expected result. On the contrary, the order of the steps described in the flow chart may be changed, for example, Step S302 and Step S303. Additionally or optionally, some steps may be omitted, a plurality of steps may be combined to one step, and/or one step may be decomposed into a plurality of steps. For example, Step S302 and Step S303 may be combined into one step.

Figure 5:
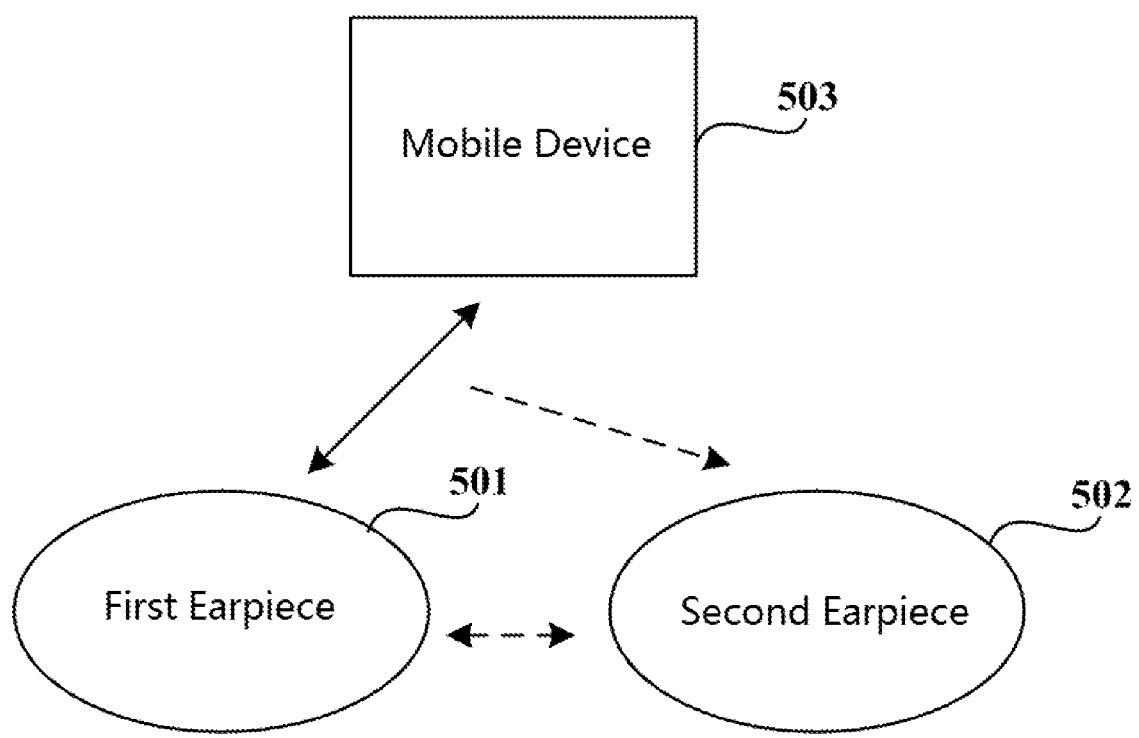
FIG. 5 is a schematic diagram of the signal transmission of a wireless headset according to one embodiment of the invention.

Correspondingly, another aspect of the invention further provides a wireless headset, which includes a first earpiece 501 and a second earpiece 502. FIG. 5 is a schematic diagram showing the signal transmission thereof, wherein:

The first earpiece 501 is configured to send the channel information about an audio transmission channel to the second earpiece 502 after establishing the audio transmission channel with a mobile device 503, receive audio data from the audio transmission channel, and sends a response message to the mobile device 503; and The second earpiece 502 is configured to receive the channel information about the audio transmission channel and receive audio data from the audio transmission channel according to the channel information about the audio transmission channel.

In some embodiments, the channel information about the audio transmission channel may specifically include:

clock synchronization information, frequency hopping channel information, packet format, signal modulation information and packaging format.

In some embodiments, the first earpiece 501 may further be configured to:

send a switching command to the second earpiece 502 when determining that dominant earpiece needs to be switched over, and stop sending the response message to the mobile device 503;

The second earpiece 502 may further be configured to:

after receiving the switching command, send a response message to the mobile device 503 after receiving audio data from the audio transmission channel.

In some embodiments, when the first earpiece 501 is the dominant earpiece that responds to the mobile device 503 and the second earpiece 502 is the non-dominant earpiece that passively receives data according to the channel information, the first earpiece 501 may further be configured to:

send a switching command to the second earpiece 502 when determining that the first earpiece itself is taken off, stop receiving the audio data and stop sending the response message to the mobile device 503; and the second earpiece 502 may further be configured to:

after receiving the switching command, send a response message to the mobile device 503 after receiving audio data from the audio transmission channel.

In certain embodiments, the first earpiece 501 may further be configured to:

acquire new channel information about the audio transmission channel from the second earpiece 502 when determining that it is put on again, and receive audio data from the audio transmission channel according to the new channel information.

In some embodiments, when the first earpiece 501 is the dominant earpiece that responds to the mobile device 503 and the second earpiece 502 is the non-dominant earpiece that passively receives data according to the channel information, the second earpiece 502 may further be configured to:

stop receiving the audio data when determining that the first earpiece itself is taken off.

In certain embodiments, the second earpiece 502 may further be configured to:

acquire new channel information about the audio transmission channel again from the first earpiece 501 when determining that the second earpiece is put on again, and receive audio data from the audio transmission channel according to the new channel information.

The flow charts and block diagrams in the drawings shows some systematic architectures, functions and operations that may be implemented by the methods, the devices and the computer-readable storage media according to various embodiments. It should be noted that, the step represented by each block in the flow chart may not be performed in the order shown by labels, sometimes, it may be performed in parallel, and sometimes, it may be performed in a reversed order, which is determined according to the functions concerned. It also needs to be noted that, each block in the block diagrams and/or the flow charts and a combination of the blocks in the block diagrams and/or the flow charts may be implemented by hardware for performing specific functions or operations, or may be implemented by a combination of hardware and computer instructions.

The units or modules concerned in the embodiments described in the invention may be implemented by means of software, or hardware.

According to the above description of the embodiments, those skilled in the art may clearly understand that each embodiment may be implemented with the aid of software plus necessary universal hardware platforms; of course, it may be implemented via hardware. Based on such an understanding, the essential part of the technical solutions in the embodiments of the invention, or in other words, the part that contributes to the prior art, may be embodied in the form of a software product that is stored in a computer-readable storage medium, for example, Read-Only Memory (ROM), Random-Access Memory (RAM), magnetic disc or compact disc, etc., and includes several instructions that can make a computer device (which may be a personal computer, a server or a network device, etc.) implement all or a part of the steps of the method according to each embodiment of the invention.

Finally, it should be noted that, the above embodiments are only provided for illustrating, rather than limiting, the technical solutions of the invention; although detailed illustration of the invention has being given referring to the above embodiments, it should be understood by one of ordinary skills in the art that modifications may be made on the technical solutions recorded in each of the above embodiment, or equivalent substitutions may be made on a part of the technical characteristics thereof, without departing from the scope of the technical solutions in each embodiment of the invention.

What is claimed is:

1. A method of signal transmission for a wireless headset, comprising:
   sending, by a first earpiece of the wireless headset, channel information about an audio transmission channel to a second earpiece of the wireless headset after establishing the audio transmission channel with a mobile device;
   receiving, by the first earpiece, audio data from the audio transmission channel, and sending a response message to the mobile device; and
   receiving, by the second earpiece, the audio data from the audio transmission channel according to the channel information about the audio transmission channel.

2. The method according to claim 1, wherein the channel information about the audio transmission channel comprises: clock synchronization information, frequency hopping channel information, packet format, signal modulation information and packaging format.

3. The method according to claim 1, further comprising:
   sending, by the first earpiece when determining that dominant earpiece needs to be switched over, a switching command to the second earpiece, and stopping sending the response message to the mobile device; and
   sending, by the second earpiece after receiving the switching command, a response message to the mobile device after receiving the audio data from the audio transmission channel.

4. The method according to claim 1, further comprising:
   sending, by the first earpiece when determining that the first earpiece itself is taken off, a switching command to the second earpiece, and stopping receiving the audio data and stopping sending the response message to the mobile device; and
   sending, by the second earpiece after receiving the switching command, a response message to the mobile device after receiving the audio data from the audio transmission channel.

5. The method according to claim 4, further comprising:
   acquiring, by the first earpiece when being put on again, new channel information about the audio transmission channel from the second earpiece and receiving the audio data from the audio transmission channel according to the new channel information.

6. The method according to claim 1, further comprising:
stopping, by the second earpiece, receiving the audio data when determining that the second earpiece itself is taken off.

7. The method according to claim 6, further comprising:
acquiring, by the second earpiece when being put on again, new channel information about the audio transmission channel from the first earpiece again, and receiving the audio data from the audio transmission channel according to the new channel information.

8. A wireless headset, comprising: a first earpiece and a second earpiece, wherein:
the first earpiece is configured to send channel information about an audio transmission channel to the second earpiece after establishing the audio transmission channel with a mobile device, receive audio data from the audio transmission channel, and send a response message to the mobile device; and
the second earpiece is configured to receive the channel information about the audio transmission channel and receive the audio data from the audio transmission channel according to the channel information about the audio transmission channel.

9. The wireless headset according to claim 8, wherein the channel information about the audio transmission channel comprises:
clock synchronization information, frequency hopping channel information, packet format, signal modulation information and packaging format.

10. The wireless headset according to claim 8, wherein the first earpiece is further configured to:
when determining that dominant earpiece needs to be switched over, send a switching command to the second earpiece and stop sending the response message to the mobile device; and
the second earpiece is further configured to:
after receiving the switching command, send a response message to the mobile device after receiving the audio data from the audio transmission channel.

11. The wireless headset according to claim 8, wherein the first earpiece is further configured to:
when determining that the first earpiece itself is taken off, send a switching command to the second earpiece, and stop receiving the audio data and stop sending the response message to the mobile device; and
the second earpiece is further configured to:
after receiving the switching command, send a response message to the mobile device after receiving the audio data from the audio transmission channel.

12. The wireless headset according to claim 11, wherein the first earpiece is further configured to:
when determining that the first earpiece is put on again, acquire new channel information about the audio transmission channel from the second earpiece and receive the audio data from the audio transmission channel according to the new channel information.

13. The wireless headset according to claim 8, wherein the second earpiece is further configured to:
when determining that the first earpiece itself is taken off, stop receiving the audio data.

14. The wireless headset according to claim 13, wherein the second earpiece is further configured to:
when determining that the second earpiece is put on again, acquire new channel information about the audio transmission channel from the first earpiece again and receive the audio data from the audio transmission channel according to the new channel information.

* * * * *